(12) United States Patent
Rottmann et al.

(10) Patent No.: US 10,089,299 B2
(45) Date of Patent: *Oct. 2, 2018

(54) MULTI-MEDIA CONTEXT LANGUAGE PROCESSING

(71) Applicant: Facebook, Inc., Menlo Park, CA (US)

(72) Inventors: Kay Rottmann, San Francisco, CA (US); Mirjam Maess, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,144

(22) Filed: Jul. 17, 2017

(65) Prior Publication Data

US 2018/0107649 A1 Apr. 19, 2018

Related U.S. Application Data

(63) Continuation of application No. 14/973,387, filed on Dec. 17, 2015, now Pat. No. 9,734,143.

(51) Int. Cl.
*G06F 17/27* (2006.01)
*G06F 17/28* (2006.01)
*G06F 17/21* (2006.01)

(52) U.S. Cl.
CPC ........... *G06F 17/278* (2013.01); *G06F 17/28* (2013.01)

(58) Field of Classification Search
CPC . G10L 15/197; G10L 15/193; G10L 15/1815; G10L 15/19; G10L 15/26; G10L 21/00; G10L 15/18; G10L 15/08; G10L 15/12; G10L 15/20; G10L 15/265; G06F 17/2765; G06F 17/275

USPC ............................................ 704/2, 257, 266
See application file for complete search history.

(56) References Cited

U.S. PATENT DOCUMENTS

| | | | |
|---|---|---|---|
| 5,293,581 A | 3/1994 | DiMarco et al. |
| 5,477,451 A | 12/1995 | Brown et al. |
| 5,510,981 A | 4/1996 | Berger et al. |
| 5,799,193 A | 8/1998 | Sherman et al. |
| 5,991,710 A | 11/1999 | Papineni et al. |

(Continued)

OTHER PUBLICATIONS

Corrected Notice of Allowability dated Jul. 13, 2017, for U.S. Appl. No. 14/973,387 of Rottmann, K., et al., filed Dec. 17, 2015.

(Continued)

*Primary Examiner* — Thierry L Pham

(57) ABSTRACT

Technology is disclosed that improves language processing engines by using multi-media (image, video, etc.) context data when training and applying language models. Multi-media context data can be obtained from one or more sources such as object/location/person identification in the multi-media, multi-media characteristics, labels or characteristics provided by an author of the multi-media, or information about the author of the multi-media. This context data can be used as additional input for a machine learning process that creates a model used in language processing. The resulting model can be used as part of various language processing engines such as a translation engine, correction engine, tagging engine, etc., by taking multi-media context/labeling for a content item as part of the input for computing results of the model.

20 Claims, 5 Drawing Sheets

(56) References Cited

U.S. PATENT DOCUMENTS

| | | | |
|---|---|---|---|
| 6,002,998 A | 12/1999 | Martino et al. | |
| 6,157,905 A | 12/2000 | Powell | |
| 6,161,082 A | 12/2000 | Goldberg | |
| 6,223,150 B1 | 4/2001 | Duan et al. | |
| 6,266,642 B1 | 7/2001 | Franz et al. | |
| 6,304,841 B1 | 10/2001 | Berger et al. | |
| 6,377,925 B1 | 4/2002 | Newman et al. | |
| 6,393,389 B1 | 5/2002 | Chanod et al. | |
| 6,629,095 B1 | 9/2003 | Wagstaff et al. | |
| 7,054,804 B2 | 5/2006 | Gonzales et al. | |
| 7,110,938 B1 | 9/2006 | Cheng et al. | |
| 7,359,861 B2 | 4/2008 | Lee et al. | |
| 7,533,019 B1 | 5/2009 | Riccardi et al. | |
| 7,664,629 B2 | 2/2010 | Dymetman et al. | |
| 7,813,918 B2 | 10/2010 | Muslea et al. | |
| 7,827,026 B2 | 11/2010 | Brun et al. | |
| 7,895,030 B2 | 2/2011 | Al-Onaizan et al. | |
| 7,983,903 B2 | 7/2011 | Gao et al. | |
| 8,015,140 B2 | 9/2011 | Kumar et al. | |
| 8,145,484 B2 | 3/2012 | Zweig et al. | |
| 8,175,244 B1 | 5/2012 | Frankel et al. | |
| 8,204,739 B2 | 6/2012 | Lane et al. | |
| 8,209,333 B2 | 6/2012 | Hubbard et al. | |
| 8,265,923 B2 | 9/2012 | Chatterjee et al. | |
| 8,275,602 B2 | 9/2012 | Curry et al. | |
| 8,386,235 B2 | 2/2013 | Duan et al. | |
| 8,543,580 B2 | 9/2013 | Chen et al. | |
| 8,756,050 B1 | 6/2014 | Curtis et al. | |
| 8,825,466 B1 | 9/2014 | Wang et al. | |
| 8,825,759 B1 | 9/2014 | Ho et al. | |
| 8,831,928 B2 | 9/2014 | Marcu et al. | |
| 8,838,434 B1 | 9/2014 | Liu | |
| 8,874,429 B1 | 10/2014 | Crosley et al. | |
| 8,897,423 B2 | 11/2014 | Nanjundaswamy | |
| 8,935,150 B2 | 1/2015 | Christ | |
| 8,942,973 B2 | 1/2015 | Viswanathan | |
| 8,949,865 B1 | 2/2015 | Murugesan et al. | |
| 8,983,974 B1 | 3/2015 | Ho et al. | |
| 8,990,068 B2 | 3/2015 | Orsini et al. | |
| 8,996,352 B2 | 3/2015 | Orsini et al. | |
| 8,996,353 B2 | 3/2015 | Orsini et al. | |
| 8,996,355 B2 | 3/2015 | Orsini et al. | |
| 9,009,025 B1 | 4/2015 | Porter et al. | |
| 9,031,829 B2 | 5/2015 | Leydon et al. | |
| 9,104,661 B1 | 8/2015 | Evans | |
| 9,183,309 B2 | 11/2015 | Gupta | |
| 9,231,898 B2 | 1/2016 | Orsini et al. | |
| 9,245,278 B2 | 1/2016 | Orsini et al. | |
| 9,336,206 B1 | 5/2016 | Orsini et al. | |
| 9,477,652 B2 | 10/2016 | Huang et al. | |
| 9,734,142 B2 | 8/2017 | Huang et al. | |
| 9,734,143 B2 * | 8/2017 | Rottmann | G06F 17/278 |
| 9,740,687 B2 | 8/2017 | Herdagdelen et al. | |
| 9,747,283 B2 | 8/2017 | Rottmann et al. | |
| 9,805,029 B2 | 10/2017 | Rottmann et al. | |
| 9,830,386 B2 | 11/2017 | Huang et al. | |
| 9,830,404 B2 | 11/2017 | Huang et al. | |
| 2002/0087301 A1 | 7/2002 | Jones et al. | |
| 2002/0161579 A1 | 10/2002 | Saindon et al. | |
| 2002/0169592 A1 | 11/2002 | Aityan | |
| 2003/0040900 A1 | 2/2003 | D'Agostini | |
| 2004/0002848 A1 | 1/2004 | Zhou et al. | |
| 2004/0049374 A1 | 3/2004 | Breslau et al. | |
| 2004/0098247 A1 | 5/2004 | Moore | |
| 2004/0122656 A1 | 6/2004 | Abir | |
| 2004/0243392 A1 | 12/2004 | Chino et al. | |
| 2005/0021323 A1 | 1/2005 | Li et al. | |
| 2005/0055630 A1 | 3/2005 | Scanlan et al. | |
| 2005/0228640 A1 | 10/2005 | Aue et al. | |
| 2006/0111891 A1 | 5/2006 | Menezes et al. | |
| 2006/0206798 A1 | 9/2006 | Kohlmeier et al. | |
| 2006/0271352 A1 | 11/2006 | Nikitin et al. | |
| 2007/0130563 A1 | 6/2007 | Elgazzar et al. | |
| 2007/0136222 A1 | 6/2007 | Horvitz et al. | |
| 2008/0046231 A1 | 2/2008 | Laden et al. | |
| 2008/0077384 A1 | 3/2008 | Agapi et al. |
| 2008/0281578 A1 | 11/2008 | Kumaran et al. |
| 2009/0070095 A1 | 3/2009 | Gao et al. |
| 2009/0083023 A1 | 3/2009 | Foster et al. |
| 2009/0132233 A1 | 5/2009 | Etzioni et al. |
| 2009/0182547 A1 | 7/2009 | Niu et al. |
| 2009/0198487 A1 | 8/2009 | Wong et al. |
| 2009/0210214 A1 | 8/2009 | Qian et al. |
| 2009/0276206 A1 | 11/2009 | Fitzpatrick et al. |
| 2009/0281789 A1 | 11/2009 | Waibel et al. |
| 2009/0326912 A1 | 12/2009 | Ueffing et al. |
| 2010/0042928 A1 | 2/2010 | Rinearson et al. |
| 2010/0121639 A1 | 5/2010 | Zweig et al. |
| 2010/0161642 A1 | 6/2010 | Chen et al. |
| 2010/0179803 A1 | 7/2010 | Sawaf et al. |
| 2010/0194979 A1 | 8/2010 | Blumenschein et al. |
| 2010/0223048 A1 | 9/2010 | Lauder et al. |
| 2010/0228777 A1 | 9/2010 | Imig et al. |
| 2010/0241416 A1 | 9/2010 | Jiang et al. |
| 2010/0283829 A1 | 11/2010 | De Beer et al. |
| 2010/0299132 A1 | 11/2010 | Dolan et al. |
| 2011/0099000 A1 | 4/2011 | Rai et al. |
| 2011/0137636 A1 | 6/2011 | Srihari et al. |
| 2011/0246172 A1 | 10/2011 | Liberman et al. |
| 2011/0246881 A1 | 10/2011 | Kushman et al. |
| 2011/0252027 A1 | 10/2011 | Chen et al. |
| 2011/0282648 A1 | 11/2011 | Sarikaya et al. |
| 2012/0005224 A1 | 1/2012 | Ahrens et al. |
| 2012/0029910 A1 | 2/2012 | Medlock et al. |
| 2012/0035907 A1 | 2/2012 | Lebeau et al. |
| 2012/0035915 A1 | 2/2012 | Kitade et al. |
| 2012/0047172 A1 | 2/2012 | Ponte et al. |
| 2012/0059653 A1 | 3/2012 | Adams et al. |
| 2012/0101804 A1 | 4/2012 | Roth et al. |
| 2012/0109649 A1 | 5/2012 | Talwar et al. |
| 2012/0123765 A1 | 5/2012 | Estelle et al. |
| 2012/0130940 A1 | 5/2012 | Gattani et al. |
| 2012/0138211 A1 | 6/2012 | Barger et al. |
| 2012/0158621 A1 | 6/2012 | Bennett et al. |
| 2012/0173224 A1 | 7/2012 | Anisimovich et al. |
| 2012/0209588 A1 | 8/2012 | Wu et al. |
| 2012/0253785 A1 | 10/2012 | Hamid et al. |
| 2012/0330643 A1 | 12/2012 | Frei et al. |
| 2013/0018650 A1 | 1/2013 | Moore et al. |
| 2013/0060769 A1 | 3/2013 | Pereg et al. |
| 2013/0084976 A1 | 4/2013 | Kumaran et al. |
| 2013/0103384 A1 | 4/2013 | Hunter et al. |
| 2013/0144595 A1 | 6/2013 | Lord et al. |
| 2013/0144603 A1 | 6/2013 | Lord et al. |
| 2013/0144619 A1 | 6/2013 | Lord et al. |
| 2013/0173247 A1 | 7/2013 | Hodson et al. |
| 2013/0246063 A1 | 9/2013 | Teller et al. |
| 2013/0317808 A1 | 11/2013 | Kruel et al. |
| 2014/0006003 A1 | 1/2014 | Soricut et al. |
| 2014/0006929 A1 | 1/2014 | Swartz et al. |
| 2014/0012568 A1 | 1/2014 | Caskey et al. |
| 2014/0025734 A1 | 1/2014 | Griffin et al. |
| 2014/0059030 A1 | 2/2014 | Hakkani-Tur et al. |
| 2014/0081619 A1 | 3/2014 | Solntseva et al. |
| 2014/0108393 A1 | 4/2014 | Angwin et al. |
| 2014/0163977 A1 | 6/2014 | Hoffmeister et al. |
| 2014/0172413 A1 | 6/2014 | Cvijetic et al. |
| 2014/0195884 A1 | 7/2014 | Castelli et al. |
| 2014/0207439 A1 | 7/2014 | Venkatapathy et al. |
| 2014/0229155 A1 | 8/2014 | Leydon et al. |
| 2014/0279996 A1 | 9/2014 | Teevan et al. |
| 2014/0280295 A1 | 9/2014 | Kurochkin et al. |
| 2014/0280592 A1 | 9/2014 | Zafarani et al. |
| 2014/0288913 A1 | 9/2014 | Shen et al. |
| 2014/0288917 A1 | 9/2014 | Orsini et al. |
| 2014/0288918 A1 | 9/2014 | Orsini et al. |
| 2014/0303960 A1 | 10/2014 | Orsini et al. |
| 2014/0335483 A1 | 11/2014 | Buryak et al. |
| 2014/0337007 A1 | 11/2014 | Fuegen et al. |
| 2014/0337989 A1 | 11/2014 | Bojja et al. |
| 2014/0350916 A1 | 11/2014 | Jagpal et al. |
| 2014/0358519 A1 | 12/2014 | Dymetman et al. |
| 2014/0365200 A1 | 12/2014 | Sagie |
| 2014/0365460 A1 | 12/2014 | Portnoy et al. |

(56) References Cited

U.S. PATENT DOCUMENTS

| | | | |
|---|---|---|---|
| 2015/0006143 | A1 | 1/2015 | Skiba et al. |
| 2015/0006219 | A1 | 1/2015 | Jose et al. |
| 2015/0033116 | A1 | 1/2015 | Severdia et al. |
| 2015/0046146 | A1 | 2/2015 | Crosley et al. |
| 2015/0066805 | A1 | 3/2015 | Taira et al. |
| 2015/0120290 | A1 | 4/2015 | Shagalov |
| 2015/0134322 | A1 | 5/2015 | Cuthbert et al. |
| 2015/0142420 | A1 | 5/2015 | Sarikaya et al. |
| 2015/0161104 | A1 | 6/2015 | Buryak et al. |
| 2015/0161110 | A1 | 6/2015 | Salz |
| 2015/0161112 | A1 | 6/2015 | Galvez et al. |
| 2015/0161114 | A1 | 6/2015 | Buryak et al. |
| 2015/0161115 | A1 | 6/2015 | Denero et al. |
| 2015/0161227 | A1 | 6/2015 | Buryak et al. |
| 2015/0213008 | A1 | 7/2015 | Orsini et al. |
| 2015/0228279 | A1 | 8/2015 | Moreno et al. |
| 2015/0293997 | A1 | 10/2015 | Smith et al. |
| 2015/0363388 | A1 | 12/2015 | Green et al. |
| 2016/0041986 | A1 | 2/2016 | Nguyen |
| 2016/0048505 | A1 | 2/2016 | Tian et al. |
| 2016/0092603 | A1 | 3/2016 | Rezaei et al. |
| 2016/0117628 | A1 | 4/2016 | Brophy et al. |
| 2016/0162473 | A1 | 6/2016 | Hedley et al. |
| 2016/0162477 | A1 | 6/2016 | Orsini et al. |
| 2016/0162478 | A1 | 6/2016 | Blassin et al. |
| 2016/0162575 | A1 | 6/2016 | Eck et al. |
| 2016/0188575 | A1 | 6/2016 | Sawaf |
| 2016/0188576 | A1 | 6/2016 | Huang et al. |
| 2016/0188661 | A1 | 6/2016 | Zhang et al. |
| 2016/0188703 | A1 | 6/2016 | Zhang et al. |
| 2016/0217124 | A1 | 7/2016 | Sarikaya et al. |
| 2016/0239476 | A1 | 8/2016 | Huang et al. |
| 2016/0267073 | A1 | 9/2016 | Noeman et al. |
| 2016/0299884 | A1 | 10/2016 | Chioasca et al. |
| 2016/0357519 | A1 | 12/2016 | Vargas et al. |
| 2017/0011739 | A1 | 1/2017 | Huang et al. |
| 2017/0083504 | A1 | 3/2017 | Huang |
| 2017/0169015 | A1 | 6/2017 | Huang |
| 2017/0177564 | A1 | 6/2017 | Rottmann et al. |
| 2017/0185583 | A1 | 6/2017 | Pino et al. |
| 2017/0185586 | A1 | 6/2017 | Rottmann |
| 2017/0185588 | A1 | 6/2017 | Rottmann et al. |
| 2017/0270102 | A1 | 9/2017 | Herdagdelen et al. |
| 2017/0315988 | A1 | 11/2017 | Herdagdelen et al. |
| 2017/0315991 | A1 | 11/2017 | Rottmann et al. |

OTHER PUBLICATIONS

Extended European Search Report for European Application No. 16161095.1, dated Feb. 16, 2017, 4 pages.
Final Office Action dated Jul. 1, 2016, for U.S. Appl. No. 14/302,032 of Herdagdelen, A., filed Jun. 11, 2014.
Final Office Action dated Jun. 16, 2017, for U.S. Appl. No. 14/586,022 of Huang, F. et al., filed Dec. 30, 2014.
International Search Report and Written Opinion for International Application No. PCT/US2015/051737, dated Jul. 28, 2016, 22 pages.
Koehn, P. et al., "Statistical Phrase-Based Translation," Proceedings of the 2003 Conference of the North American Chapter of the Association for computational Linguistics on Human Language Technology—vol. 1, Assoc. for Computational Linguistics, 2003, p.
Non-Final Office Action dated Dec. 17, 2015, for U.S. Appl. No. 14/302,032 of Saint Cyr, L., filed Jun. 11, 2014.
Non-Final Office Action dated Dec. 21, 2016, for U.S. Appl. No. 14/586,022 of Huang, F., filed Dec. 30, 2014.
Non-Final Office Action dated Dec. 29, 2016, for U.S. Appl. No. 14/586,049 of Huang, F. et al., filed Dec. 30, 2014.
Non-Final Office Action dated Dec. 30, 2016 in U.S. Appl. No. 14/586,074 by Huang, F. et al., filed Dec. 30, 2014.
Non-Final Office Action dated Feb. 9, 2017, for U.S. Appl. No. 14/559,540 of Eck, M. et al., filed Dec. 3, 2014.
Non-Final Office Action dated Jan. 12, 2017, for U.S. Appl. No. 15/275,235 of Huang, F. et al., filed Sep. 23, 2016.
Non-Final Office Action dated Jan. 19, 2017, for U.S. Appl. No. 14/980,654 of Pino, J. et al., filed Dec. 28, 2015.
Non-Final Office Action dated Jul. 28, 2016, for U.S. Appl. No. 14/861,747 of F. Huang, filed Sep. 22, 2015.
Non-Final Office Action dated Jun. 26, 2017 for U.S. Appl. No. 15/445,978 of Amac Herdagdelen, filed Feb. 28, 2017.
Non-Final Office Action dated Mar. 10, 2016, for U.S. Appl. No. 14/621,921 of Huang, F., filed Feb. 13, 2015.
Non-Final Office Action dated Nov. 9, 2016, for U.S. Appl. No. 14/973,387 by Rottmann, K., et al., filed Dec. 17, 2015.
Non-Final Office Action dated Oct. 6, 2016, U.S. Appl. No. 14/981,794 of Rottmann, K. filed Dec. 28, 2015.
Notice of Allowance dated Apr. 13, 2017, for U.S. Appl. No. 14/973,387 of Rottmann, K., et al., filed Dec. 17, 2015.
Notice of Allowance dated Apr. 19, 2017, for U.S. Appl. No. 14/981,769 by Rottmann, K., et al., filed Dec. 28, 2015.
Notice of Allowance dated Apr. 20, 2017 for U.S. Appl. No. 14/302,032 by Herdagdelen, A., et al., filed Jun. 11, 2014.
Notice of Allowance dated Apr. 7, 2017 for U.S. Appl. No. 14/861,747 by Huang, F., et al., filed Sep. 22, 2015.
Notice of Allowance dated Jul. 12, 2017, for U.S. Patent Application No. 14/981,794 by Rottmann, K., et al., filed Dec. 28, 2015.
Notice of Allowance dated Jul. 18, 2016, for U.S. Appl. No. 14/621,921 of Huang, F., filed Feb. 13, 2015.
Notice of Allowance dated Jul. 26, 2017, for U.S. Appl. No. 14/586,074 by Huang, F., et al., filed Dec. 30, 2014.
Notice of Allowance dated Jul. 28, 2017, for U.S. Appl. No. 14/586,049 by Huang, F., et al., filed Dec. 30, 2014.
Notice of Allowance dated Jun. 6, 2017, for U.S. Appl. No. 14/981,794 by Rottman, K., et al., filed Dec. 28, 2015.
Notice of Allowance dated Mar. 1, 2017, for U.S. Appl. No. 14/981,769 by Rottmann, K., et al., filed Dec. 28, 2015.
Notice of Allowance dated Nov. 30, 2016, for U.S. Appl. No. 14/302,032 of Herdagdelen, A., filed Jun. 11, 2014.
Supplemental Notice of Allowability dated Jul. 13, 2017, for U.S. Appl. No. 14/981,769 by Rottmann, K., et al., filed Dec. 28, 2015.
Sutskever, I., et al., "Sequence to sequence learning with neural networks," Advances in Neural Information Processing Systems, pp. 3104-3112, 2014.
U.S. Appl. No. 14/302,032 of Herdagdelen, A et al., filed Jun. 11, 2014.
U.S. Appl. No. 14/559,540 of Eck, M et al., filed Dec. 3, 2014.
U.S. Appl. No. 14/586,022 of Huang, F. et al., filed Dec. 30, 2014.
U.S. Appl. No. 14/586,049, by Huang et al., filed Dec. 30, 2014.
U.S. Appl. No. 14/586,074 by Huang et al., filed Dec. 30, 2014.
U.S. Appl. No. 14/621,921 of Huang, F., filed Feb. 13, 2015.
U.S. Appl. No. 14/861,747 by Huang, F., filed Sep. 22, 2015.
U.S. Appl. No. 14/967,897 of Huang F. et al., filed Dec. 14, 2015.
U.S. Appl. No. 14/973,387, of Rottmann, K., et al., filed Dec. 17, 2015.
U.S. Appl. No. 14/980,654 of Pino, J. et al., filed Dec. 28, 2015.
U.S. Appl. No. 14/981,769 by Rottmann, K., et al., filed Dec. 28, 2015.
U.S. Appl. No. 14/981,794 by Rottmann, K., et al., filed Dec. 28, 2015.
U.S. Appl. No. 15/199,890 of Zhang, Y. et al., filed Jun. 30, 2016.
U.S. Appl. No. 15/244,179 of Zhang, Y., et al., filed Aug. 23, 2016.
U.S. Appl. No. 15/275,235 of Huang, F. et al., filed Sep. 23, 2016.
U.S. Appl. No. 15/445,978 by Herdagdelen, A., et al., filed Feb. 28, 2017.
U.S. Appl. No. 15/644,690 of Huang, F. et al., filed Jul. 7, 2017.
U.S. Appl. No. 15/654,668 of Rottmann, K., filed Jul. 19, 2017.
Vogel, S. et al., "HMM—Based Word Alignment in Statistical Translation." In Proceedings of the 16th Conference on Computational Linguistics—vol. 2, Association for Computational Linguistics, 1996, pp. 836-841.
Zamora, J.D., et al., "Tweets language identification using feature weightings," Proceedings of the Twitter language identification workshop, Sep. 16, 2017, 5 pages.
Final Office Action dated Aug. 10, 2017 for U.S. Appl. No. 15/275,235 by Huang, F. et al. filed Sep. 23, 2016.

(56) References Cited

OTHER PUBLICATIONS

Final Office Action dated Aug. 25, 2017 for U.S. Appl. No. 14/980,654 by Pino, J. et al., filed Dec. 28, 2015.
Non-Final Office Action dated Aug. 25, 2017 for U.S. Appl. No. 15/652,175 by Herdagdelen, A., filed Jul. 17, 2017.
Non-Final Office Action dated Aug. 29, 2017 for U.S. Appl. No. 14/967,897 by Huang, F., filed Dec. 14, 2015.
Notice of Allowance dated Aug. 30, 2017 for U.S. Appl. No. 14/559,540 by Eck, M. et al. filed Dec. 3, 2014.
Notice of Allowance dated Aug. 4, 2017, for U.S. Appl. No. 14/981,794 by Rottman, K., et al., filed Dec. 28, 2015.
U.S. Appl. No. 15/672,690 of Huang, F., filed Aug. 9, 2017.
U.S. Appl. No. 15/696,121 of Rottmann, K. et al., filed Sep. 5, 2017.
Corrected Notice of Allowability dated Nov. 17, 2017, for U.S. Appl. No. 14/559,540 of Eck, M. et al., filed Dec. 3, 2014.
Notice of Allowance dated Dec. 8, 2017 for U.S. Appl. No. 15/652,175 by Herdagdelen, A., filed Jul. 17, 2017.
Corrected Notice of Allowability dated Dec. 12, 2017, for U.S. Appl. No. 14/559,540 of Eck, M. et al., filed Dec. 3, 2014.
U.S. Appl. No. 15/820,351 by Huang et al., filed Nov. 21, 2017.
U.S. Appl. No. 15/821,167 by Huang et al., filed Nov. 22, 2017.
Final Office Action dated Sep. 8, 2017 for U.S. Appl. No. 15/445,978 of Herdagdelen, A. filed Feb. 28, 2017.
Notice of Allowability dated Sep. 12, 2017 for U.S. Appl. No. 14/981,794 by Rottman, K., et al., filed Dec. 28, 2015.
Notice of Allowability dated Sep. 19, 2017 for U.S. Appl. No. 14/559,540 by Eck, M. et al. filed Dec. 3, 2014.
Notice of Allowance dated Oct. 10, 2017 for U.S. Appl. No. 15/275,235 for Huang, F. et al., filed Sep. 23, 2016.
Notice of Allowance dated Oct. 23, 2017 for U.S. Appl. No. 15/445,978 of Herdagdelen, A. filed Feb. 28, 2017.
Taylor, S. et al. "Forecasting at Scale" Jan. 2017, retrieved from https://facebookincubator.github.io/prophet/static/prophet_paper_20170113.pdf.
U.S. Appl. No. 15/723,095 of Tiwari, P. filed Oct. 2, 2017.

* cited by examiner

MULTI-MEDIA CONTEXT LANGUAGE PROCESSING

BACKGROUND

The Internet has made it possible for people to connect and share information across the globe in ways previously undreamt of. Social media platforms, for example, enable people on opposite sides of the world to collaborate on ideas, discuss current events, or just share what they had for lunch. In the past, this spectacular resource has been somewhat limited to communications between users having a common natural language ("language"). Users have only been able to consume content that is in their language, or for which a content provider is able to determine an appropriate translation. Furthermore, the accuracy of language processing has been limited because machines have been unable to appropriately determine and apply contextual information for processing language.

Although language processing is a particular challenge, several types of language processing engines, such as parts-of-speech tagging engines, correction engines, and machine translation engines, have been created to address this concern. These language processing engines enable "content items," which can be any item containing natural language including text, images, audio, video, or other multi-media, to be quickly classified, translated, sorted, read aloud, tagged, and otherwise used by machines. However, content items can be inaccurately processed due to rules and engines that do not account for the context of content items. For example, the word "lift" can mean "move upward" among speakers of American English (as that word is commonly used in America), whereas it can mean "elevator" for British English speakers. A content item including the phrase, "press the button for the lift," could be translated into either "press the button for the elevator" or "press the button to go up." In addition, machine translations of a content item are often based on dictionary translations and do not consider context, which often makes a significant difference such as in slang or colloquial passages.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
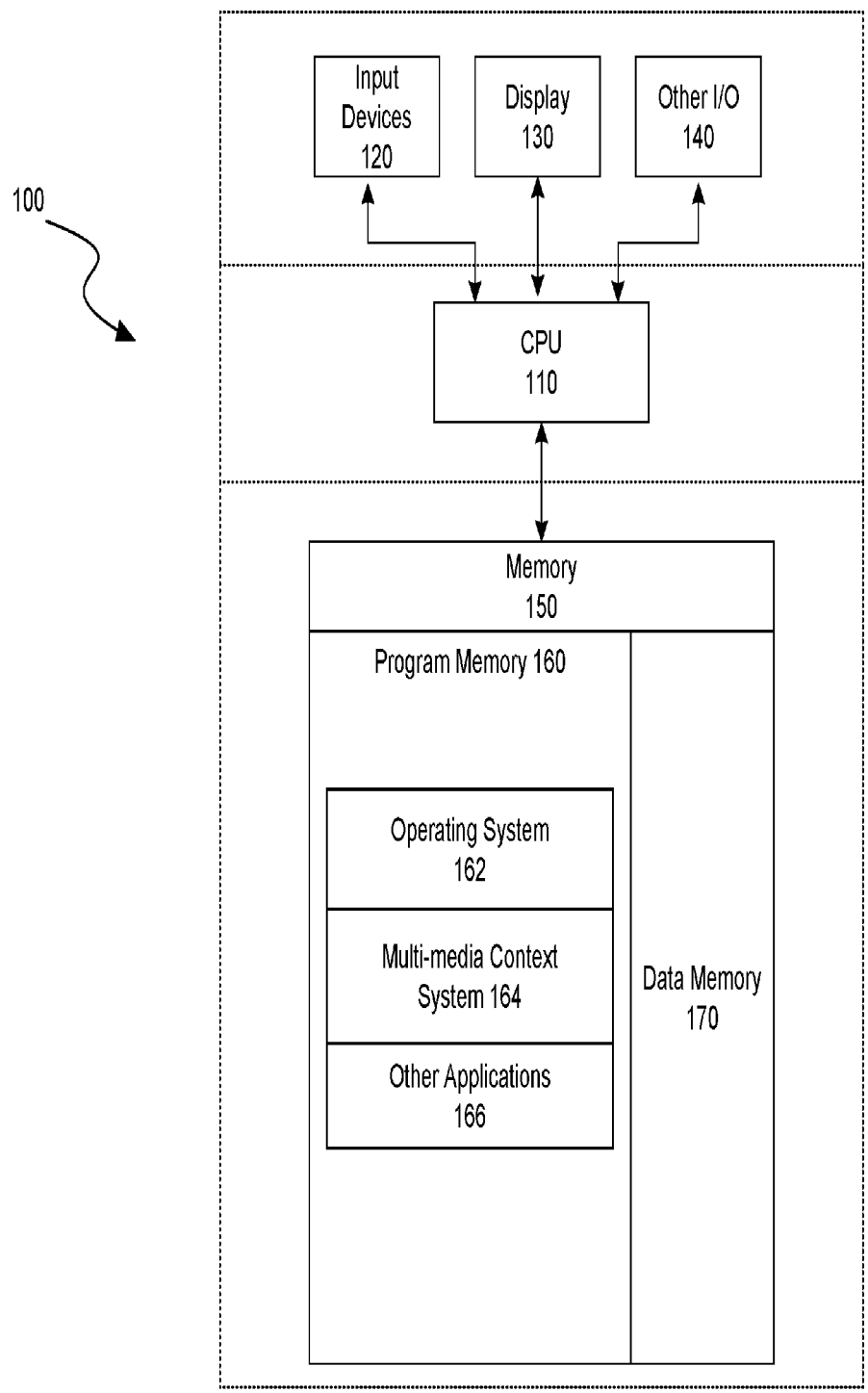
FIG. 1 is a block diagram illustrating an overview of devices on which some implementations can operate.

Embodiments for identifying and using a multi-media context during language processing are described. Multi-media context data can be obtained from one or more sources such as object, location, or person identification in multi-media items, multi-media characteristics, labels or characteristics provided by an author of the multi-media, or information about the author of the multi-media. This context data can be used as part of the input for a machine learning process that creates a model used in language processing. The resulting model can take multi-media context data or labeling for a content item as part of the input for computing results of the model. These models can be used as part of various language processing engines such as a translation engine, correction engine, tagging engine, etc.

"Multi-media," as used herein, refers to one or more of: an image, a video, a sound file, a webpage, hyperlink, an application, a widget, a script, or any combination thereof. As used herein, a "snippet" or "n-gram" is a digital representation of one or more words or groups of characters from a natural language. In some implementations, snippets can be obtained from social network content items, such as posts. A "model," as used herein, refers to a construct that is trained using training data to make predictions or to provide probabilities for new data items, whether or not the new data items were included in the training data. For example, training data can include items with various parameters and an assigned classification. A new data item can have parameters that a model can use to assign a classification to the new data item. As another example, a model can be a probability distribution resulting from the analysis of training data, such as the likelihood of an n-gram occurring in a given language based on an analysis of a large corpus from that language, the likelihood of an n-gram occurring in a translation given an input, or the likelihood of an n-gram occurring in a translation given an input and other parameters. Examples of models include: neural networks, support vector machines, decision trees, Parzen windows, Bayes, clustering, reinforcement learning, probability distributions, and others. Models can be configured for various situations, data types, sources, and output formats.

When processing a content item that includes language, the context provided by multi-media associated with the content item can affect how that language should be processed. For example, if a content item included the phrase "How do you like my rog?" a language processing engine configured to make corrections may produce candidate corrections including: "How do you like my dog?" "How do you like my hog?" and "How do you like my jog?" The content item can be associated with a picture, and an object analysis of the picture can determine that a dog is depicted in the picture. This multi-media context can be used by a language model that is part of the correction engine to select the "How do you like my dog?" correction.

In some implementations, a multi-media context system can train models with training data that comprises a language corpus with various portions of the language corpus associated with various multi-media labels. In some implementations, training data can comprise multiple pairs of (A) starting snippets (e.g. snippets to be translated or snippets to be corrected) and (B) output language (e.g. translated snippets or corrected snippets) where each pair is associated with one or more multi-media items or labels. The multi-media context system can identify labels for the multi-media items and use these labels as part of input to the model when performing model training. These labels can partially control the output from the model which the multi-media context system can compare to the corresponding output language to adjust parts of the model, thereby training it.

Additional details describing training a language processing model to use multi-media context data are discussed below in relation to FIG. 4.

The multi-media context system can apply trained models in language processing operations on content items that are associated with one or more multi-media items. For example, a content item can be a post to a social media website and the post can contain a link to a video. The multi-media context system can perform an analysis of the associated multi-media items to obtain labels for the multi-media items. For example, the multi-media context system can apply an object identification algorithm to the video that is linked to the post content item and use the resulting object identifications as labels from the video. The multi-media context system can then apply a trained model to a combination of: a representation of language in the content item and representations of the labels. Results of the trained model can be used for processing the language in the content item. Additional details describing applying a language processing model with multi-media context data are discussed below in relation to FIG. 5.

Attempts to develop language processing engines in fields such as translation, error correction, parts-of-speech tagging, etc., have been tried since people have been creating digital representations of language. These attempts have developed numerous sophisticated algorithms employing various technical mechanisms such as distributed computing, machine learning, targeted programming, etc. Language processing engines can be improved by employing multi-media context data. For example, to understand many content items that employ language, a multi-media context of the content item may be helpful or even necessary. Therefore, systems that utilize multi-media context data when performing language processing can improve the language processing field.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that implements multi-media context language processing. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, multi-media context system 164, and other application programs 166. Memory 150 can also include data memory 170 that can include content items, multi-media items, labels, content author characteristics, content interactions, models, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
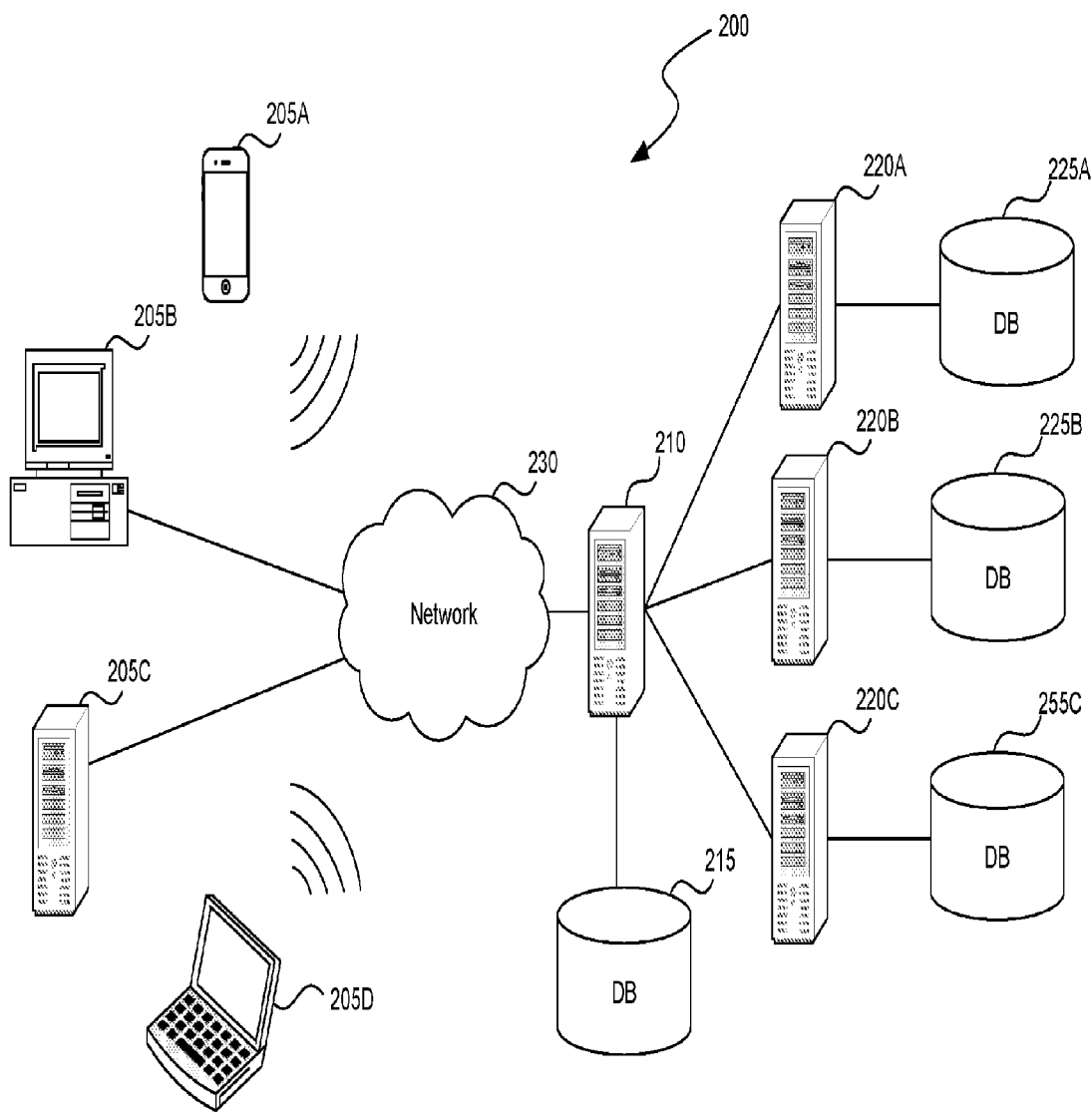
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
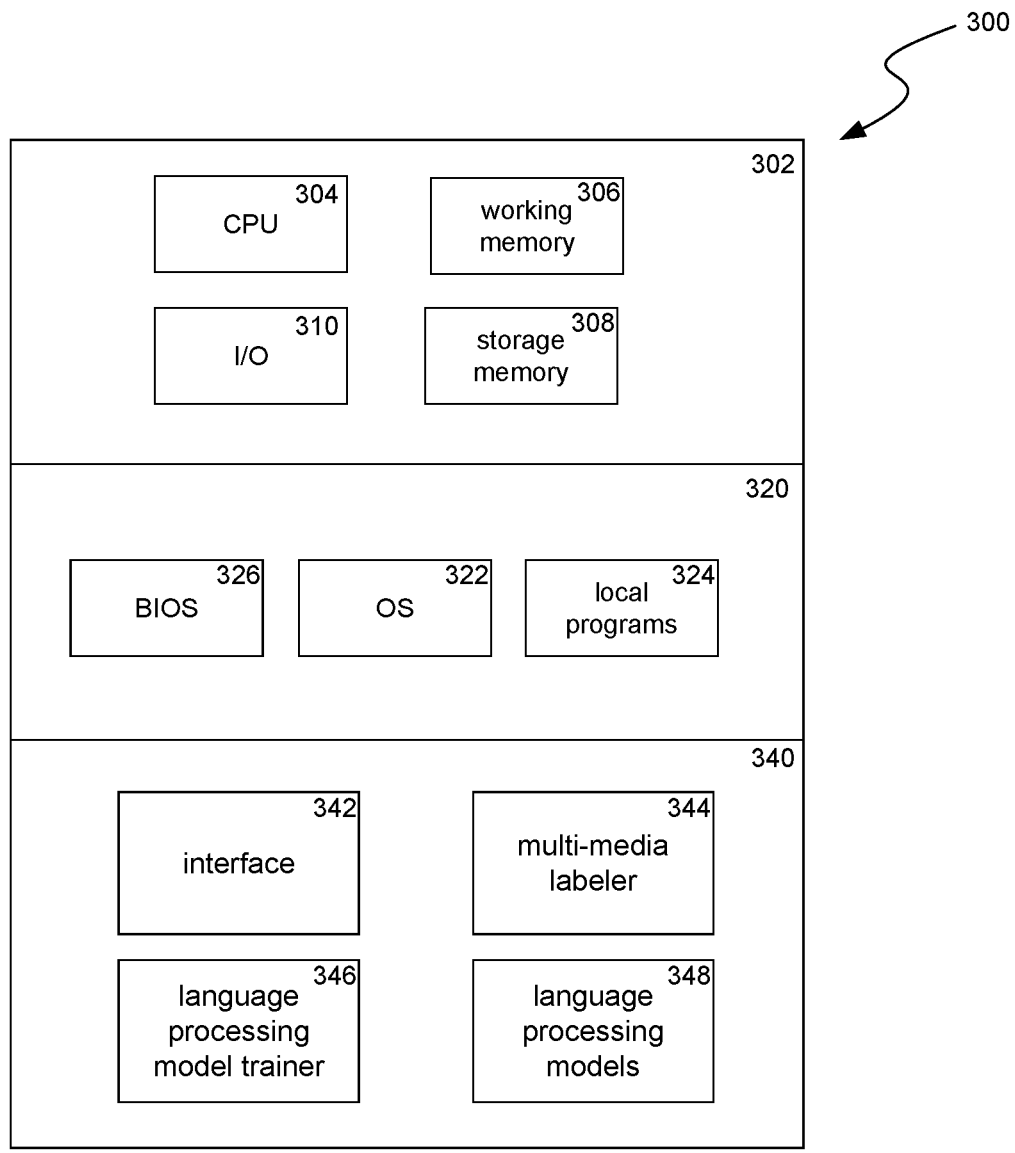
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include multi-media labeler 344, language processing model trainer 346, language processing models 348, and components which can be used for transferring data and controlling the specialized components, such as interface 342. In some implementations, components 300 can be in a computing system that is distributed across multiple computing devices or can include an interface to a server-based application.

Multi-media labeler 344 can be configured to receive a multi-media item, such as through interface 342. Multi-media labeler 344 can analyze the received multi-media item to determine labels. In some implementations, these labels can include identification of objects, identification of people, or identification of places. In some implementations, multi-media labeler 344 can retrieve these labels from assignations made by an author of a content item associated with the multi-media item. For example, a user posting a content item with multi-media to a social media website can provide labels such as tags of people in a photo, one or more pre-defined tags corresponding to moods or actions describing the multi-media, or textual description of the multi-media item. In some implementations, multi-media labeler 344 can retrieve these labels from characteristics of an author of a content item associated with a multi-media item. In some implementations, multi-media labeler 344 can retrieve these labels from interactions of users with a content item associated with a multi-media item or from characteristics of users who perform such interactions.

Language processing model trainer 346 can be configured to generate a model, of models 348, that can be used in various language processing engines. For example, language processing model trainer 346 can generate language models, translation models, correction models, tagging models, etc. Language processing model trainer 346 can train a model by receiving training data content items that are each associated with one or more multi-media items and that have a desired output from a model. Language processing model trainer 346 can employ multi-media labeler 344 to determine labels for the multi-media items. These labels for a multi-media item can be combined with a representation of the language from the content item corresponding to the multi-media item, for example in a sparse vector or embedding. Each of these combinations can be used as input to a model. Based on a comparison of the output of the model for each content item and the desired output corresponding to each content item, parameters of the model can be trained. After applying and modifying the model for the items in the training data, the model can be trained to operate on new content items that have corresponding multi-media items.

Language processing models 348 can be generated by language processing model trainer 346. Particular ones of language processing models 348 can be applied to content items that are associated with one or more multi-media items, whether or not the content items were in training data used to create the language processing model. Applying one of language processing models 348 to a content item associated with one or more multi-media items can include employing multi-media labeler 344 to determine labels for the multi-media items. These labels for a multi-media item can be combined with a representation of the language from the content item corresponding to the multi-media item. The combination can be used as input to the language processing model, and the result can inform the processing of a language processing engine.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
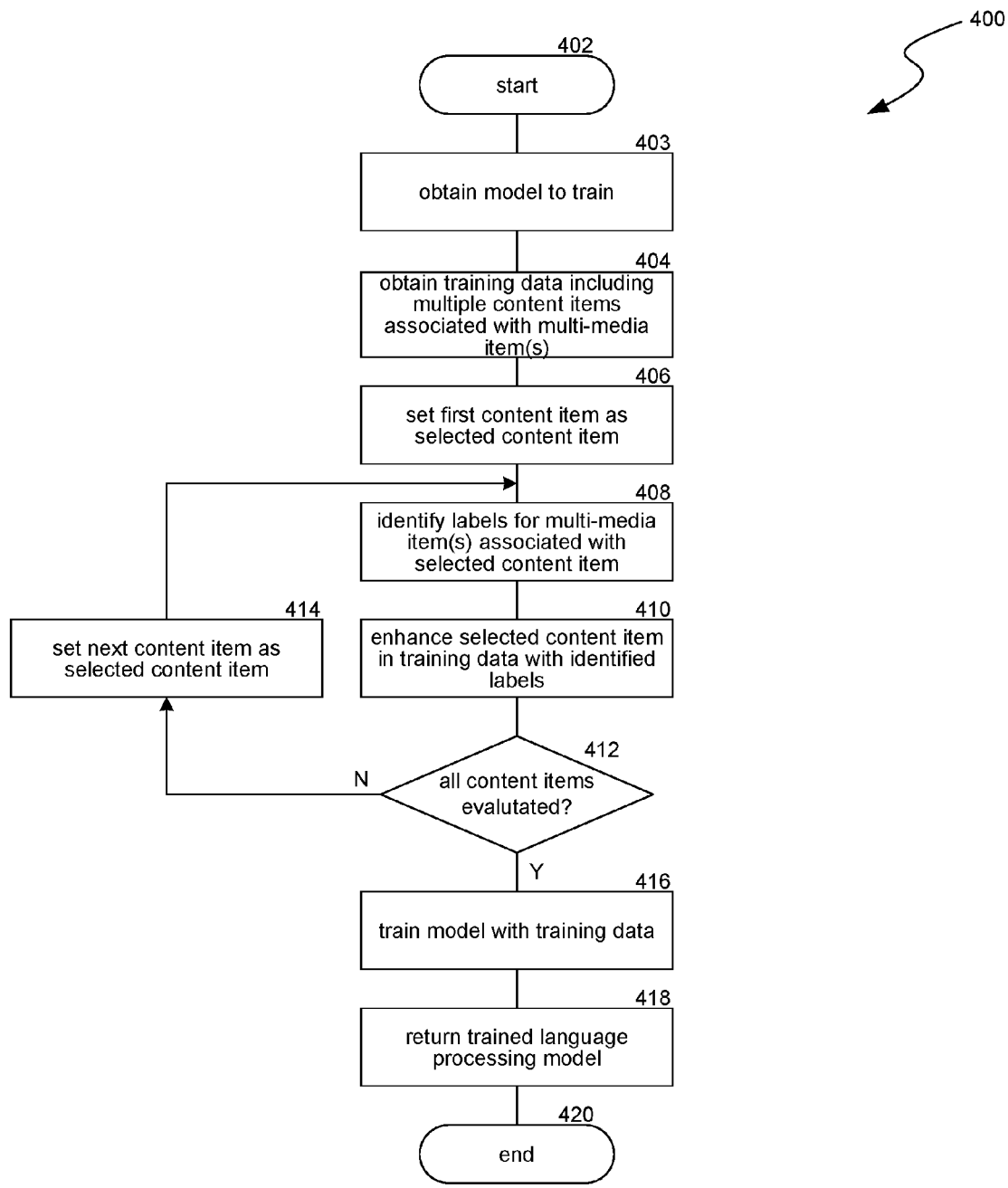
FIG. 4 is a flow diagram illustrating a process used in some implementations for training a model using a multi-media context.

FIG. 4 is a flow diagram illustrating a process 400 used in some implementations for training a model using a multi-media context. Process 400 begins at block 402 and continues to block 403. At block 403, process 400 can obtain a model to train. The obtained model can be various types of probability distributions or machine learning objects such as a neural network, support vector machine, Bayesian model, decision tree, etc. This model can initially have default or random parameters set. For example, where the model is a neural network, the weights between nodes can be set to default or random values. At block 404, process 400 can obtain training data that includes multiple content items, each associated with one or more multi-media items. In some implementations, content items can be from a social media website such as wall posts, news feeds, messages, group pages, event pages, etc.

At block 406, process 400 can set a first content item of the obtained training data as a selected content item to be operated on by the loop between blocks 408 and 414. At block 408, process 400 can identify labels for the multi-media items. In some implementations, identifying labels comprises performing an object recognition analysis on the multi-media items. In some implementations, the object recognition analysis can identify objects from a defined set of objects. In some implementations, identifying labels comprises identifying people in the multi-media items. Identifying people can include, e.g., facial recognition algorithms. In some implementations, identifying labels comprises place recognition, e.g., by recognizing landmarks, associated GPS or other location data, etc. In some implementations, identifying labels comprises extracting metadata from the multi-media items, e.g., timestamps, location markers, source id, etc. In some implementations, identifying labels comprises identifying words in the multi-media, e.g., with speech recognition on sounds or with text recognition on images.

In some implementations, identifying labels comprises obtaining labels provided by an author of the content item or by users of a social media system. For example, a content item author can provide a label indicating what the author is feeling, writing about, watching, celebrating, thinking about, listening to, looking for, traveling to, playing, making, attending, reading, getting, eating, drinking, meeting, or that they are exercising. In some implementations, identifying labels comprises information about the multi-media item such as its file size, dimensions, colors used or color profiles, whether it is a manufactured image (e.g. a drawing or a computer created image) or captured by an image capture device (e.g. a photo), a date, length, type, encoding, etc. In some implementations, identifying labels comprises identifying characteristics of an author of the content item, such as gender, age, location, educational level, friends, profession, relationship status, etc. In some implementations, identifying labels comprises identifying statistics and characteristics of users who access the content item. For example, labels can include a number of accesses, times of the accesses, a user rating, number of shares, an identified type of typical users who view the content item, etc. In some implementations, the labels identified at block 408 can be from a defined set of possible labels.

Process 400 can assign the labels identified at block 408 to content (e.g. n-grams) of the content item associated with the multi-media items for which the labels were generated. In some implementations, the labels can be assigned to parts of the content items. For example, where a label is identified as corresponding to a particular type of speech (e.g. a noun) one or more identified noun type labels can be associated with nouns or pronouns in the content item. The same can be done for other parts of speech, such as where a user defined label identified an action which can be assigned to a verb or adverb in the content item. As a more specific example, where a content item includes the phrase "That is great!" which is associated with a picture of a car, a label corresponding to the noun car can be associated with the pronoun "that" in the content item. The determination of types of speech can use POS tagging technology, such as is described in U.S. patent application Ser. No. 14/804,802, entitled "DATA SORTING FOR LANGUAGE PROCESSING SUCH AS POS TAGGING," incorporated herein by reference.

At block 410, process 400 can enrich the selected content item by associating with it the labels identified at block 408. In some implementations, the training data can comprise pairs of (A) model input with associated multi-media context data and (B) exemplary model output data. In some implementations, the model input can be an embedding of the phrase combined with the multi-media context data labeling. In some implementations, the training data can comprise a corpus of phrases where at least some of the phrases are associated with multi-media context data.

At block 412, process 400 can determine whether all the content items obtained at block 404 have been operated on by the loop between blocks 408-414, and if so process 400 continues to block 416. If not, process 400 continues to block 414, where a next item of the content items of the training data obtained at block 404 is set as the selected content item to be operated on by the loop between blocks 408-414.

At block 416, process 400 can use the training data, enhanced with the labels by the loop between blocks 408-414, to train the model received at block 403. In some implementations, the model can be a language model indicating a probability distribution showing the likelihood of phrases occurring given a multi-media context. In some implementations, the model can be a translation model indicating a probability distribution showing the likelihood of phrases occurring in a translation given a multi-media context. In some implementations, the model can be a translation model indicating a likely translation of a source phrase given the source phrase and a multi-media context. The model can be other types of models such as correction models or parts-of-speech tagging models. Training a language model can include examining the training data and assigning, to each n-gram in the training data, a probability based on its comparative frequency of occurrence in the training data. This probability can be further based on the labels assigned at block 408 to n-grams in the training data, such that the probabilities are probabilities given a set of labels.

Training a model that relies on a neural network can include encapsulating the labels and/or n-grams of the content item in a format that can be fed into the neural network, such as in a vector. Some embodiments for encapsulating n-grams in a vector are described in U.S. patent application Ser. No. 14/878,794, entitled "LANGUAGE INDEPENDENT REPRESENTATIONS," incorporated herein by reference. A neural network can be trained with supervised learning, such as for translations, where the training data includes the content item and associated labels as input and a desired output, such as a known translation of the content item. A representation of each content item with associated representations of labels determined at block 408 can be provided to the neural network model received at block 403. Output from the model can be compared to the desired output for that content item and, based on the comparison, the neural network can be modified, such as by changing weights between nodes of the neural network or parameters of the functions used at each node in the neural network. After applying each of the content items in the training data and modifying the neural network in this manner, the neural network model can be trained to evaluate new content items with associated multi-media, as discussed below in relation to FIG. 5. At block 418, process 400 can return the model trained at block 416. Process 400 can then continue to block 420, where it ends.

Figure 5:
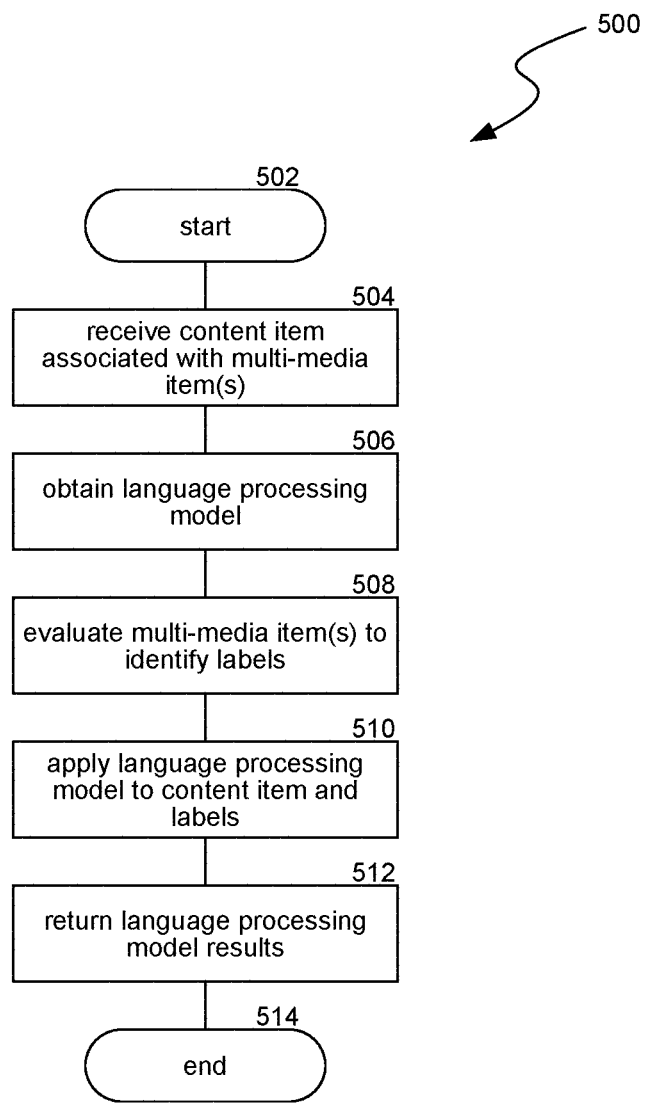
FIG. 5 is a flow diagram illustrating a process used in some implementations for applying a model to a content item with a multi-media context.

FIG. 5 is a flow diagram illustrating a process 500 used in some implementations for applying a model to a content item with a multi-media context. Process 500 begins at block 502 and continues to block 504. At block 504, process 500 can receive a content item associated with one or more multi-media items. As discussed above, multi-media items can be pictures, video, sound, web links, apps, scripts, etc.

At block 506, process 500 can obtain a language processing model. In some implementations, the language processing model obtained at block 506 can be a language processing model trained using process 400.

At block 508, process 500 can evaluate the multi-media items associated with the content item received at block 504. This evaluation can identify one or more labels for the multi-media item. Representations of these labels can be associated with the entire content item or with portions of the content item received at block 504. In some implementations, evaluation of multi-media items can be performed in the same manner by process 500 as is performed by process 400 at block 408. Evaluation of multi-media items to determine labels can be the same process used to label training data that was used to create the model received at block 506. In various implementations, these representations can be tags or vector encapsulations of the labels associated with various content items or portions (e.g. n-grams) of content items.

At block 510, process 500 can apply the language processing model received at block 506 to a combination of a representation of the content item received at block 504 and representations of the labels determined at block 508. In some implementations, process 500 can apply a language model which can include determining which of several possible phrases is most likely given the multi-media labels determined at block 508. For example, where the language processing performed by process 500 is translations, a translation model can produce multiple possible translations of a content item and the content item can have been assigned labels corresponding to an associated multi-media item. In this example, process 500 can have received a language processing model at block 506 that gives phrase probabilities given multi-media labels. Applying this model at block 510, process 500 can obtain a likelihood of each of the possible translations given the associated labels. The possible translation with the highest likelihood can be selected as a preferred translation.

As another example, the language processing performed by process 500 can be parts-of-speech tagging, and a content item to be tagged has been assigned labels corresponding to an associated multi-media item at block 508. The model received at block 506 can be a neural network trained to perform tagging where the input to the model includes multi-media labels. One or more words from the content item can be provided to the tagging model, together with a representation of corresponding labels, and the model can provide a tag for that portion of the content item.

At block 512, process 500 can return results from applying the language processing model at block 510. Process 500 can then proceed to block 514, where it ends.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for generating a language processing model, comprising:
   obtaining one or more multi-media labels,
      wherein each multi-media label is based on a corresponding multi-media item that is associated with a content item,
      wherein each particular multi-media label is associated with one or more n-grams from the content item that is associated with the multi-media item that corresponds to the particular multi-media label, and
      wherein an n-gram is a digital representation of one or more words or groups of characters;
   including, in a language corpus, the one or more n-grams associated with each of the one or more multi-media labels; and
   generating the language processing model comprising a probability distribution by computing, for each selected n-gram of multiple n-grams in the language corpus, a frequency that the selected n-gram occurs in the language corpus,
      wherein one or more of the probabilities provided by the probability distribution are multi-media context probabilities indicating a probability of a chosen n-gram occurring, given that the chosen n-gram is associated with provided one or more multi-media labels, wherein the multi-media context probabilities are based on the associations between the one or more multi-media labels and the one or more n-grams.

2. The method of claim 1, wherein the language processing model is a translation model, and wherein the multi-media context probabilities indicate a probability of an output n-gram being a translation of an input n-gram, given: (A) the input n-gram and (B) multi-media labels associated with the input n-gram.

3. The method of claim 1, wherein the association of at least one multi-media label, of the one or more multi-media labels, to the one or more n-grams is a result of performing object identification on the multi-media item that corresponds to the at least one multi-media label.

4. The method of claim 1, wherein the association of at least one multi-media label, of the one or more multi-media labels, to the one or more n-grams is a result of performing object identification on the multi-media item that corresponds to the at least one multi-media label; and
wherein generating the association comprised selecting the at least one multi-media label from a pre-defined set of labels comprising at least object labels and/or place labels.

5. The method of claim 1, wherein the association of at least one multi-media label, of the one or more multi-media labels, to the one or more n-grams is a result of an author, of the content item that is associated with the multi-media item that corresponds to the at least one multi-media label, providing the at least one multi-media label.

6. The method of claim 1, wherein the association, of at least an individual multi-media label that is of the one or more multi-media labels and that corresponds to a multi-media item associated with an individual content item, is based on one or more of: characteristics of an author of the individual content item, characteristics of user interactions with the individual content item, characteristics of users who have interacted with the individual content item, or any combination thereof.

7. The method of claim 1,
wherein at least one multi-media item, corresponding to one of the one or more multi-media labels, comprises an image or video; and
wherein the association of the one of the one or more multi-media labels to one or more n-grams is a result of determining, for the image or video, one or more of:
a file size;
dimensions of the image or video;
colors used in the image or video;
a color profile for the image or video;
whether or not the image or video was captured by an image capture device;
a date the image or video was created;
a type corresponding to the image or video;
an encoding of the image or video; or
any combination thereof.

8. The method of claim 1, wherein at least one multi-media item, corresponding to one of the one or more multi-media labels, comprises an image.

9. The method of claim 1, wherein at least one multi-media item, corresponding to one of the one or more multi-media labels, comprises one or more of: a video, a file including sound, an application, or any combination thereof.

10. The method of claim 1, wherein the association of at least one multi-media label, of the one or more multi-media labels, to the one or more n-grams is a result of:
matching a label type of the at least one multi-media label to an n-gram type of the one or more n-grams; and
based on the matching, associating the at least one multi-media label with the one or more n-grams.

11. A system for applying a translation model, the system comprising: one or more processors;
an interface configured to obtain one or more input n-grams,
wherein an n-gram is a digital representation of one or more words or groups of characters; and
wherein each of the one or more input n-grams is associated with one or more multi-media labels for one or more multi-media items associated with the one or more input n-grams; and
a memory storing instructions that, when executed by the one or more processors, cause the system to perform operations comprising applying, to each particular n-gram of the one or more input n-grams, the translation model,
wherein the translation model comprises a probability distribution indicating, for selected n-grams, a probability that an output n-gram is a translation of the selected n-gram, given one or more multi-media labels; and
wherein the applying the translation model includes selecting one or more output n-grams that, based at least in part on the probability distribution, have a highest probability of being the translation of the particular n-gram, given the one or more multi-media labels associated with the particular n-gram.

12. The system of claim 11, wherein at least one multi-media label, of the one or more multi-media labels, identifies at least one of: an object, a place, a person, or any combination thereof, depicted in the one or more multi-media items that the at least one multi-media label is for.

13. The system of claim 11,
wherein at least one multi-media label, of the one or more multi-media labels, identifies at least one of: an object, a place, a person, or any combination thereof, depicted in the one or more multi-media items that the at least one multi-media label is for; and
wherein the at least one multi-media label is selected from a set of pre-defined object, place, or person labels.

14. The system of claim 11, wherein at least one multi-media label, of the one or more multi-media labels, was identified by an author of the one or more input n-grams.

15. The system of claim 11, wherein at least one multi-media label, of the one or more multi-media labels, is based on one or more of: characteristics of an author of the one or more input n-grams, characteristics of user interactions with the one or more input n-grams, characteristics of users who have interacted with the one or more input n-grams, or any combination thereof.

16. A non-transitory computer-readable storage medium storing instructions that, when executed by a computing system, cause the computing system to perform operations for generating a language processing model, the operations comprising:
obtaining one or more multi-media labels,
wherein each multi-media label is based on a corresponding multi-media item that is associated with a content item, and
wherein each particular multi-media label is associated with one or more n-grams from the content item that is associated with the multi-media item that corresponds to the particular multi-media label;
including, in a language corpus, the one or more n-grams associated with each of the one or more multi-media labels; and
generating the language processing model comprising a probability distribution by computing, for each selected n-gram of multiple n-grams in the language corpus, a frequency that the selected n-gram occurs in the language corpus, wherein at least one of the probabilities provided by the probability distribution is based on the associations between the one or more multi-media labels and the one or more n-grams.

17. The non-transitory computer-readable storage medium of claim 16, wherein the association of at least one multi-media label, of the one or more multi-media labels, to the one or more n-grams is a result of performing object identification on the multi-media item that corresponds to the at least one multi-media label.

18. The non-transitory computer-readable storage medium of claim 16,
   wherein the association of at least one multi-media label, of the one or more multi-media labels, to the one or more n-grams is a result of performing object identification on the multi-media item that corresponds to the at least one multi-media label; and
   wherein generating the association comprised selecting the at least one multi-media label from a pre-defined set of labels comprising at least object labels or place labels.

19. The non-transitory computer-readable storage medium of claim 16, wherein the association of at least one multi-media label, of the one or more multi-media labels, to the one or more n-grams is a result of a user providing the at least one multi-media label in relation to the content item that is associated with the multi-media item that corresponds to the at least one multi-media label.

20. The non-transitory computer-readable storage medium of claim 16, wherein the association, of at least an individual multi-media label that is of the one or more multi-media labels and that corresponds to a multi-media item associated with an individual content item, is based on one or more of: characteristics of an author of the individual content item, characteristics of user interactions with the individual content item, characteristics of users who have interacted with the individual content item, or any combination thereof.

* * * * *